United States Patent [19]

Witte

[11] Patent Number: 5,333,899
[45] Date of Patent: Aug. 2, 1994

[54] SIDE AIRBAG SAFETY ARRANGEMENT FOR VEHICLE OCCUPANTS

[75] Inventor: Bastian Witte, Braunschweig, Fed. Rep. of Germany

[73] Assignee: Volkswagen AG, Wolfsburg, Fed. Rep. of Germany

[21] Appl. No.: 16,761

[22] Filed: Feb. 11, 1993

[30] Foreign Application Priority Data

Feb. 25, 1992 [DE] Fed. Rep. of Germany ....... 4205705

[51] Int. Cl.$^5$ ............................................ B60R 21/22
[52] U.S. Cl. .............................. 280/730 A; 280/728 R
[58] Field of Search ........... 280/728 R, 730 R, 730 A, 280/743 A, 743 R

[56] References Cited

U.S. PATENT DOCUMENTS

| | | | |
|---|---|---|---|
| 2,834,606 | 5/1958 | Bertrand | 280/730 R |
| 4,966,388 | 10/1990 | Warner et al. | 280/734 |
| 5,031,929 | 7/1991 | Henseler | 280/730 R |
| 5,174,599 | 12/1992 | Hull et al. | 280/731 |

FOREIGN PATENT DOCUMENTS

| | | |
|---|---|---|
| 1555142 | 7/1970 | Fed. Rep. of Germany . |
| 3913034 | 11/1989 | Fed. Rep. of Germany . |
| 3276844 | 12/1991 | Japan ................................ 280/730 A |
| 1381999 | 1/1975 | United Kingdom . |
| 2191450 | 12/1987 | United Kingdom ............ 280/730 R |

*Primary Examiner*—Margaret A. Focarin
*Assistant Examiner*—Victor E. Johnson
*Attorney, Agent, or Firm*—Brumbaugh, Graves, Donohue & Raymond

[57] ABSTRACT

A safety arrangement to protect a vehicle occupant in lateral accidents includes at least one airbag positioned above the lintel and at least one airbag positioned below the sill of a side window. The airbags are arranged so that, upon activation, the facing surface areas thereof will be engaged and form a limitedly fixed transverse connection so that, at least during an initial phase of an accident, the airbags will provide an inflated side wall.

3 Claims, 2 Drawing Sheets

SIDE AIRBAG SAFETY ARRANGEMENT FOR VEHICLE OCCUPANTS

BACKGROUND OF THE INVENTION

This invention relates to safety arrangements for vehicle occupants using side airbags.

German Offenlegungsschrift No. 39 13 034 describes an airbag arranged below the sill of a side window in the door trim of an automobile, British Patent No. 1 381 999 discloses an airbag mounted above the lintel of a door window in the region of a side roof member, and German Offenlegungsschrift No. 15 55 142 discloses airbags both at the sill and at the lintel of a side window. The use of airbags to protect vehicle occupants in lateral collisions of a vehicle is especially important because there is not enough available space laterally of the occupants to provide an adequate deformation travel in contradistinction to the front and rear portions of the vehicle. Prior to its release, an airbag occupies very little space but, once it has been released because of an accident, it can assume its final shape without interfering with riding comfort.

SUMMARY OF THE INVENTION

Accordingly, it is an object of the present invention to provide a side airbag safety arrangement for vehicle occupants which overcomes the disadvantages of the prior art.

Another object of the invention is to provide a side airbag safety arrangement which is optimized in terms of its protective effect in a lateral accident.

These and other objects of the invention are attained by providing at least two side airbags mounted above and below the window of a vehicle and arranged to come into contact upon inflation and be joined to provide a coherent inflated wall covering the entire window opening adjacent to a vehicle occupant. As long as the windowpane is intact, it will support the wall formed by the airbags. If the windowpane has been broken, and if there is an object external to the vehicle in the region of the window opening such as a colliding obstacle, the wall formed by the inflated airbags will engage the latter and prevent a hard impact against the hard object, especially by the head of the occupant. But, if the windowpane has been destroyed and there is no support outside the vehicle for the inflated wall formed by the airbags, the joint between the airbags which may, for example, be in the nature of a hook-and-loop or "Velcro" fastening will not be able to withstand the force exerted by the occupant, in particular by his head, and the airbags will be deformed outwardly in such manner as to protect the occupant from edge fragments of the windowpane. Furthermore, the airbag mounted near the windowsill will then serve to provide cushioning between the occupant's head as it protrudes through the window opening and the front end portion such as the hood of a vehicle colliding with the side of the occupant's vehicle.

To expedite inflation of the airbags and hence the formation of the inflated wall, either or both of the upper and lower airbags may be replaced by a plurality of smaller airbags arranged to be activated simultaneously.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
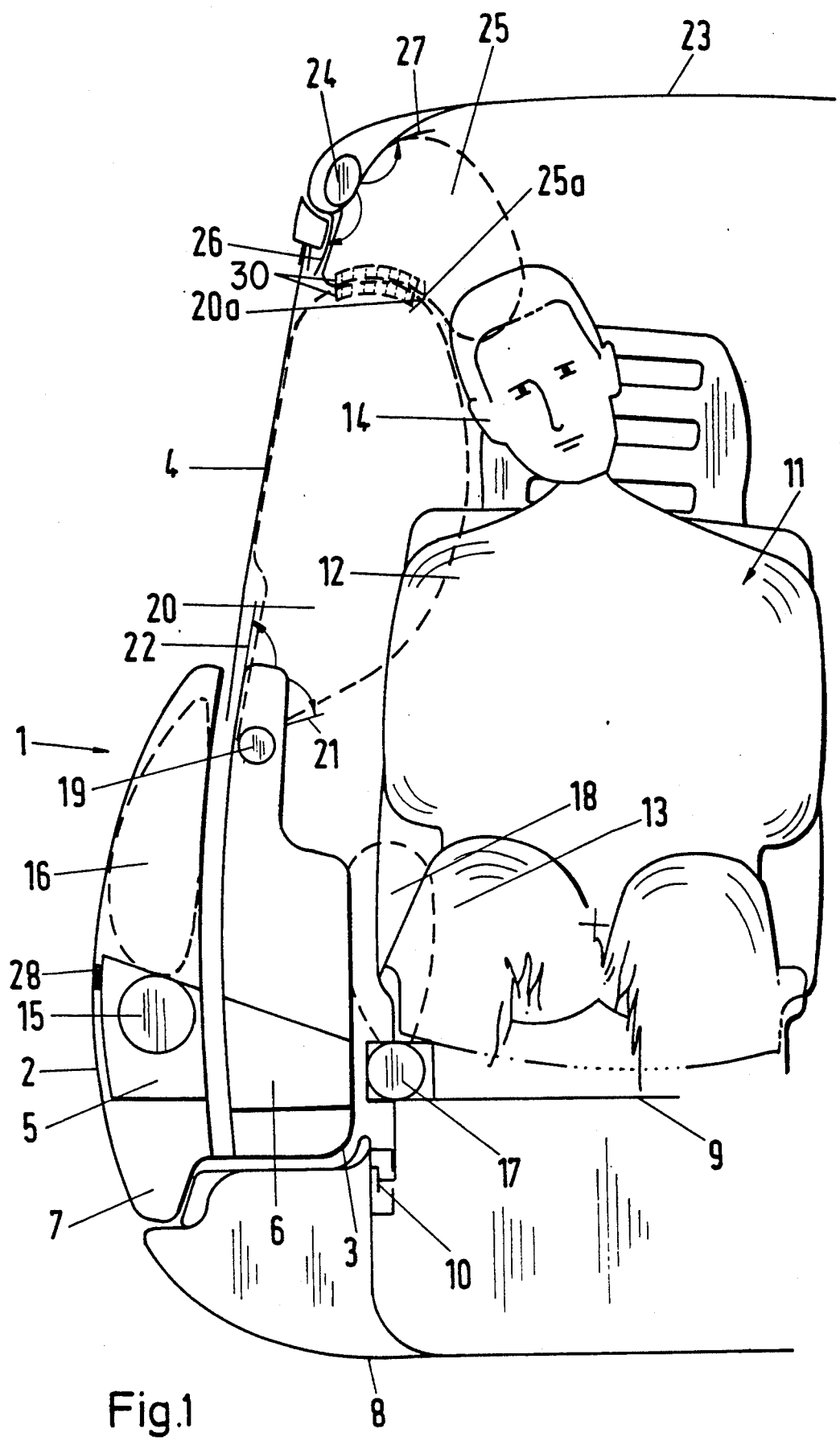
FIG. 1 is a schematic fragmentary cross-sectional view of a portion of a vehicle containing an occupant showing a wall formed by two inflated side airbags in accordance with a representative embodiment of the invention.
Figure 2:
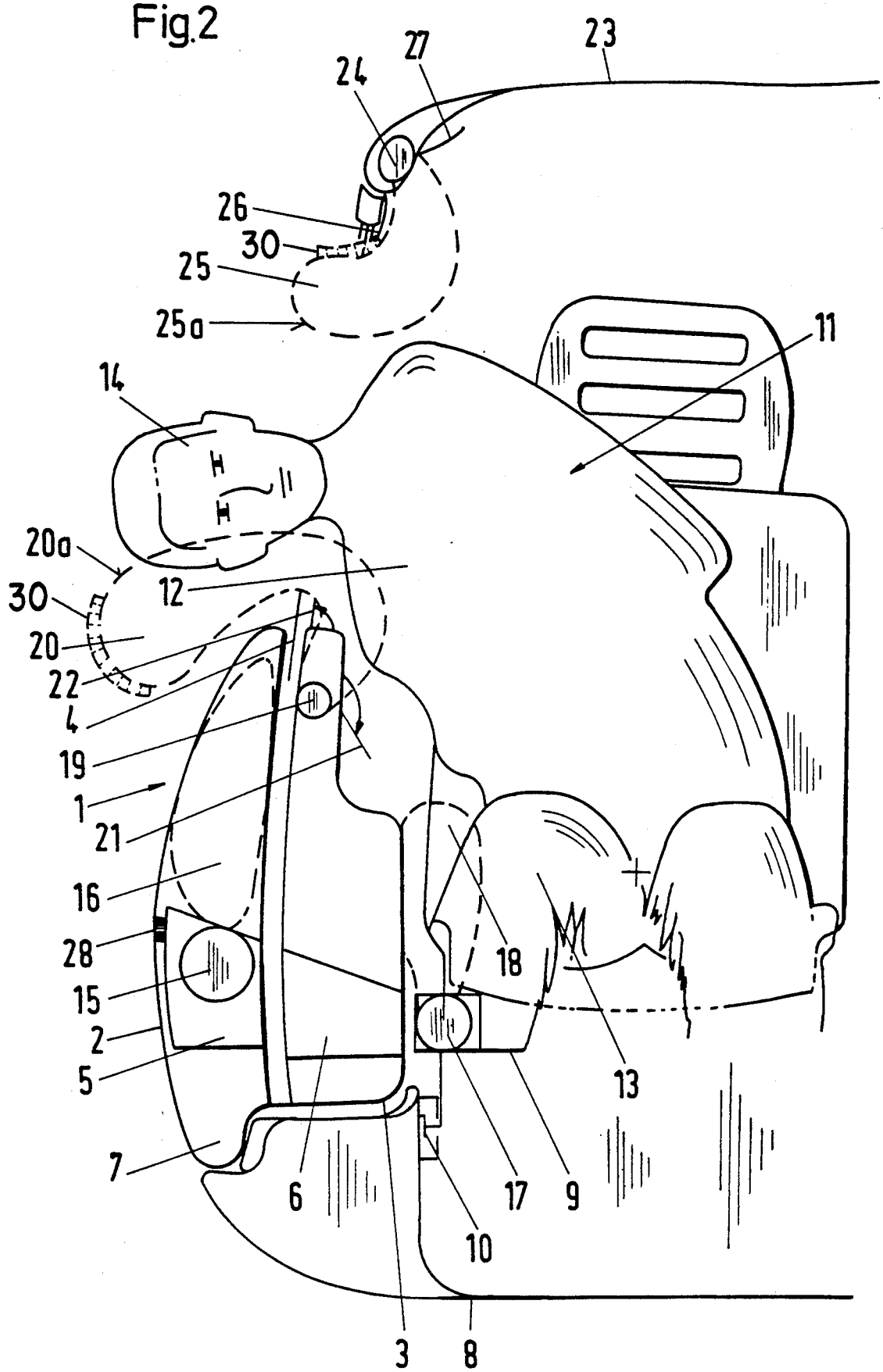
FIG. 2 is a schematic view similar to FIG. 1 showing the arrangement of the airbags when the window is broken.

In the illustrations of FIGS. 1 and 2, the same reference numerals are used to designate corresponding parts.

In the typical arrangement of the invention shown in FIG. 1, a lateral impact in which the pane of the side window has not been shattered is presumed to have occurred. In this embodiment, a vehicle door 1 provides a well between an outer wall 2 and an inner wall 3 to receive a lowerable pane 4 of the door window and for two longitudinal structural door members 5 and 6 which will be pushed against a seat support in the event of a side impact on the vehicle. At its bottom region, the door has an external downward projection 7 which will engage a doorsill 8 in a lateral impact. A seat 9, which is supported for longitudinal adjustment by a support 10, is positioned adjacent to the door 1. The seat is occupied by a vehicle occupant 11 having a trunk 12, a hip and thigh region 13 and a head 14. Near the outer wall 2 of the door, a gas generator 15 is mounted to supply gas to a door airbag 16 which is arranged between the outer wall 2 of the door and the window well. Another gas generator 17, mounted in the door frame, is arranged to supply gas to an airbag 18 which extends, in its inflated condition, protectively between the door 1 and the thigh area 13 of the occupant 11. Finally, a third gas generator 19 is mounted in the door to supply gas to an airbag 20 which is positioned below the windowsill. In its normal condition, the airbag 20 is concealed beneath two flaps 21 and 22, which are illustrated in their open condition.

In the portion of the roof 23 near the window lintel, a gas generator 24 is mounted adjacent to another airbag 25. The airbag 25 is similarly concealed in its normal condition beneath two flaps 26 and 27. These flaps, like the flaps 21 and 22, are normally connected together along a rupturable line extending between their free edges.

In a lateral impact on the vehicle, a contact or acceleration sensor 28 triggers all of the illustrated gas generators so that the airbags 16, 18, 20 and 25 are inflated to the shapes illustrated in dash lines in the drawings. The two airbags 20 and 25 are of special interest in connection with the invention.

As the airbag 20 is inflated by its gas generator 19, the two flaps 21 and 22, joined along their projecting edges, at first prevent it from emerging into the passenger compartment. Upon the increase of pressure inside the airbag 20, however, the weak joint between the two flaps is burst open so that the flaps move apart in the direction of the arrows in FIG. 1 and release the airbag. Then the airbag finally assumes the position and shape as shown in FIG. 1, in which it is supported by the as-yet unbroken windowpane 4. Preferably, the airbag 20 is designed so that it will first move upwardly as far as possible parallel to the windowpane 4 and will expand toward the occupant 11 as far as possible only in a final phase of its expansion.

Substantially the same operation occurs during inflation of the upper airbag 25. Triggered by the sensor 28, the gas generator 24 inflates the bag so that it will burst out of the covering provided by the two flaps 26 and 27 upon suitable pressure build-up. The opening motions of these two flaps are likewise indicated by arrows in FIG. 1. Both of the airbags 20 and 25 are designed so that they will meet at engaging surface areas 20a and 25a, which are arranged to make a limitedly fixed connection transversely between the two airbags 20 and 25. This may be accomplished by a positive geometrical interconnection between the engaging surface areas 20a and 25a. Alternatively, however, an additional connecting structure, for example, in the nature of "Velcro" hook-and-loop fastenings 30, may be provided on those surfaces.

In the phase of an accident assumed in FIG. 1, the two airbags 20 and 25 thus form an inflated lateral curtain or wall for the upper portion of the occupant so that, in case of a subsequent destruction of the windowpane 4, no splinters of glass can be projected into the interior of the vehicle.

As long as the windowpane 4 is intact, it provides support for the two inflated airbags 20 and 25. With suitable dimensioning of the airbags in the direction perpendicular to the plane of the drawing in FIG. 1, they may also abut upon the adjoining A and B or B and C columns of the vehicle. In this way, the body of the passenger, and particularly his head 14, is cushioned from all hard portions of the vehicle structure.

FIG. 2 illustrates the condition in the phase of an accident in which the windowpane 4 has been destroyed. As a result, the windowpane 4 can no longer support the two airbags 20 and 25. The forces of inertia exerted by the vehicle occupant 11 in the outward direction ultimately become so great that the connection between the surface areas 20a and 25a of the airbags 20 and 25 no longer retains them together. Consequently, the airbags are deformed outwardly, covering the lower and upper edge glass fragments of the destroyed pane 4 as shown in FIG. 2. At the same time, the flaps 22 and 26 provide protection for the material of the airbags 20 and 25 against destruction by the glass fragments along the edge. The lower airbag 20 also provides protection for the head 14 of the occupant 11 against a hard impact with an external object, for example, the hood of a colliding vehicle. This airbag also supports the shoulder region 12 of the occupant. The chief function of the upper airbag 25 is to protect the head 14 of the occupant 11 from a hard impact against the roof 23.

If the windowpane 4 has been destroyed but a portion of a colliding object such as the front of another vehicle is in the position of the windowpane, the airbags 20 and 25 will abut against that portion, substantially retaining their conformation as shown in FIG. 1, thereby preventing a hard impact of the occupant 11, and especially his head 14, with that portion. This will happen particularly when the colliding vehicle is a truck with a high front structure.

As has already been indicated, special measures may be taken to expedite the inflation of the several airbags. For example, each of the larger airbags may be replaced by a plurality of smaller airbags arranged to be inflated simultaneously. Each airbag may also be provided with a plurality of gas generators. In each case, the invention provides more effective, quick-acting lateral protection for vehicle occupants.

Although the invention has been described herein with reference to specific embodiments, many modifications and variations therein will readily occur to those skilled in the art. Accordingly, all such variations and modifications are included within the intended scope of the invention.

I claim:

1. A safety arrangement for vehicle occupants comprising at least one upper airbag mounted to the vehicle at or above a lintel of a side window of a vehicle and at least one lower airbag mounted to the vehicle door at or below a sill of the window, the airbags being arranged to move upon expansion towards each other into mutual engagement along facing surfaces, said surfaces including means for providing a releasable transverse connection therebetween and to provide a cushion extending between and connected to the lintel and the sill of the side window.

2. A safety arrangement according to claim 1 including a hook-and-loop fastening arrangement on the facing surfaces of the airbags.

3. A safety arrangement according to claim 1 wherein the airbags are arranged so as to cover edge fragments of a broken windowpane upon disengagement of the transverse connection.

* * * * *